June 26, 1973  J. H. ROWE  3,741,778
PACKAGE WITH SELF-CONTAINED HANDLE FOR STORING AND
HEATING FOOD, AND METHOD OF FORMING SAME
Filed March 9, 1971  3 Sheets-Sheet 2
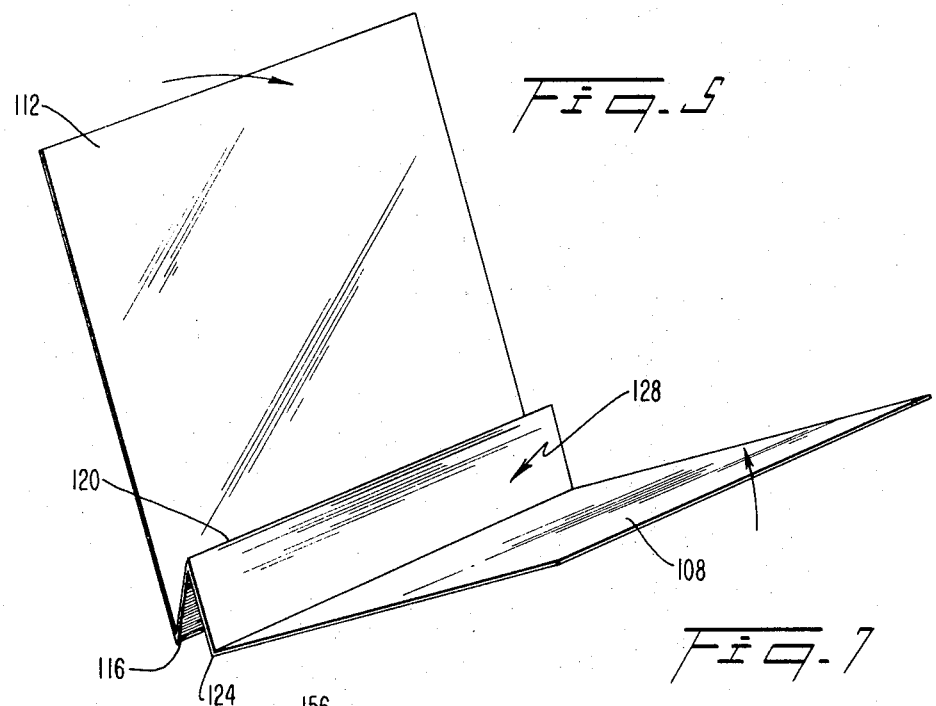
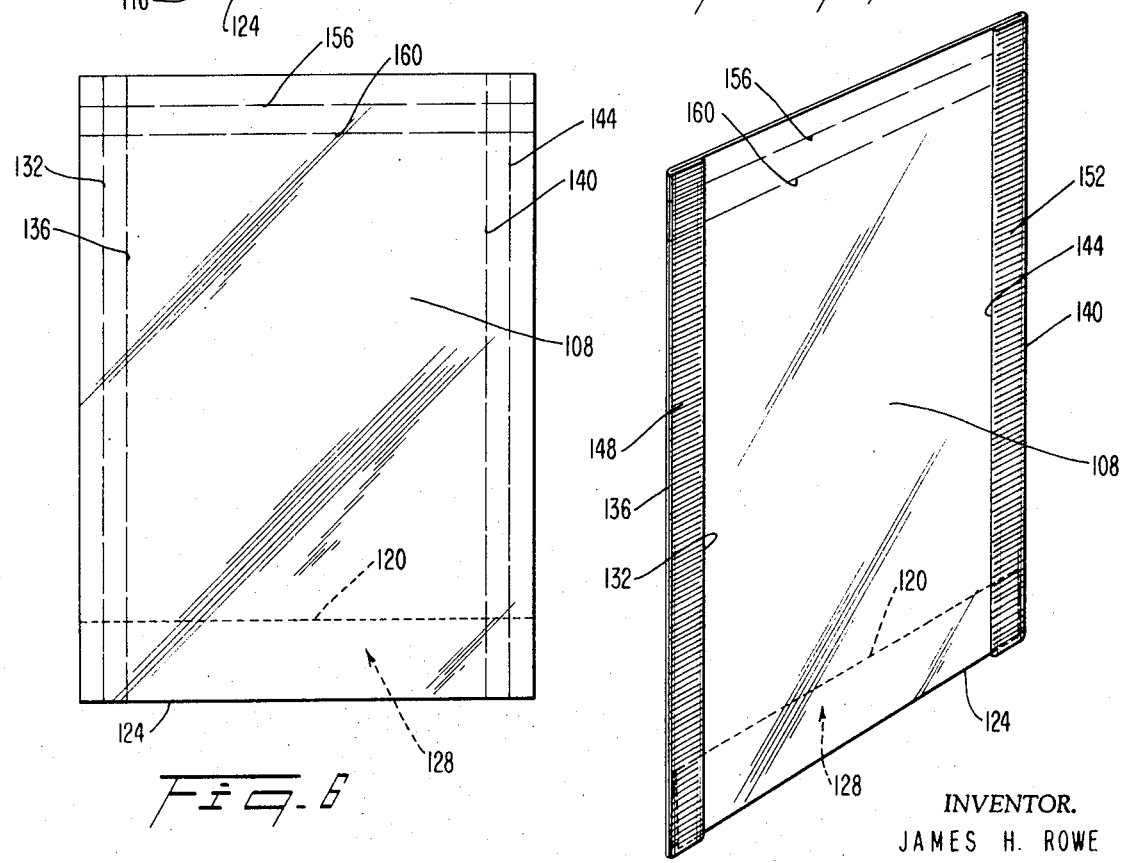
INVENTOR.
JAMES H. ROWE

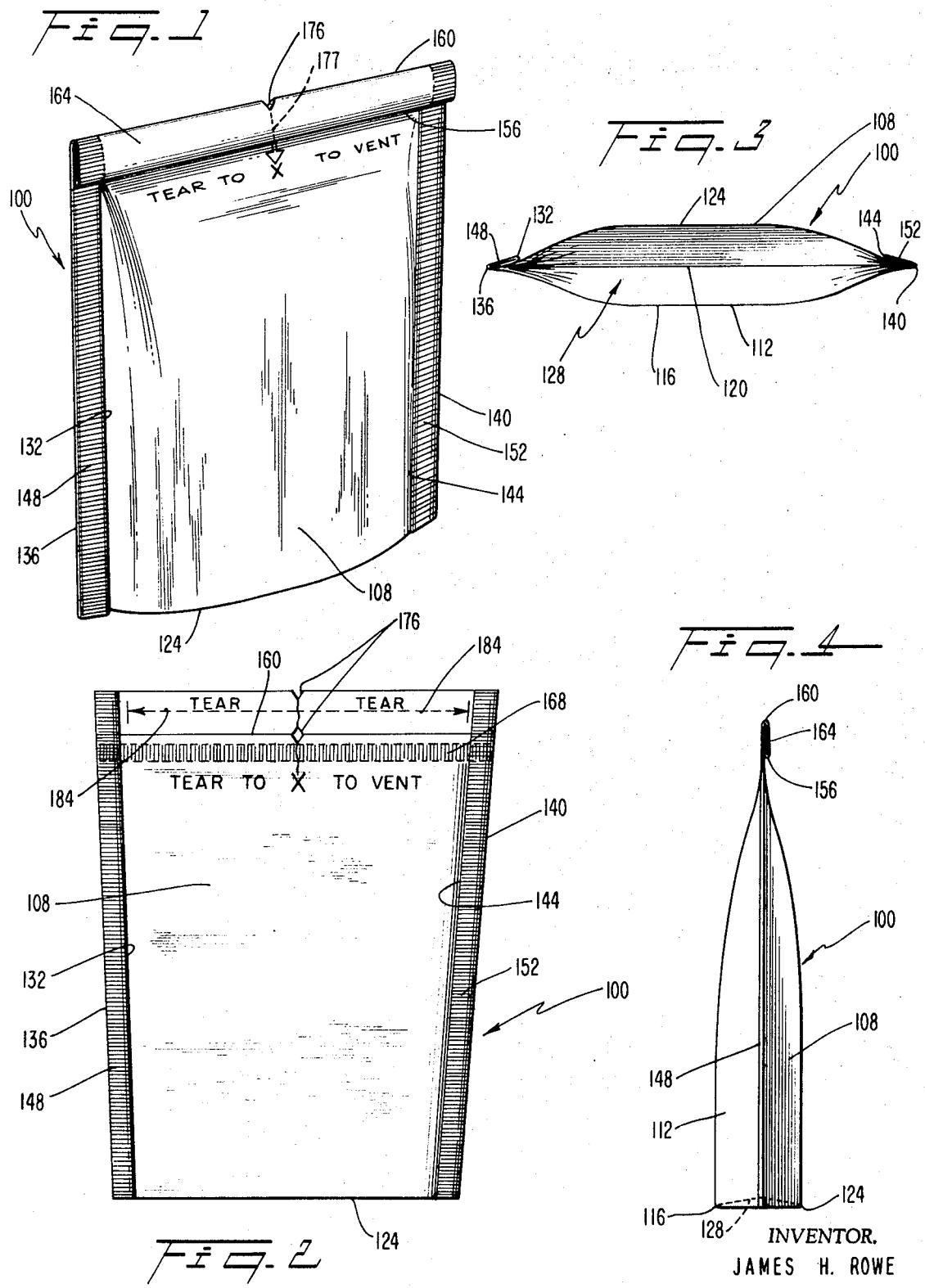

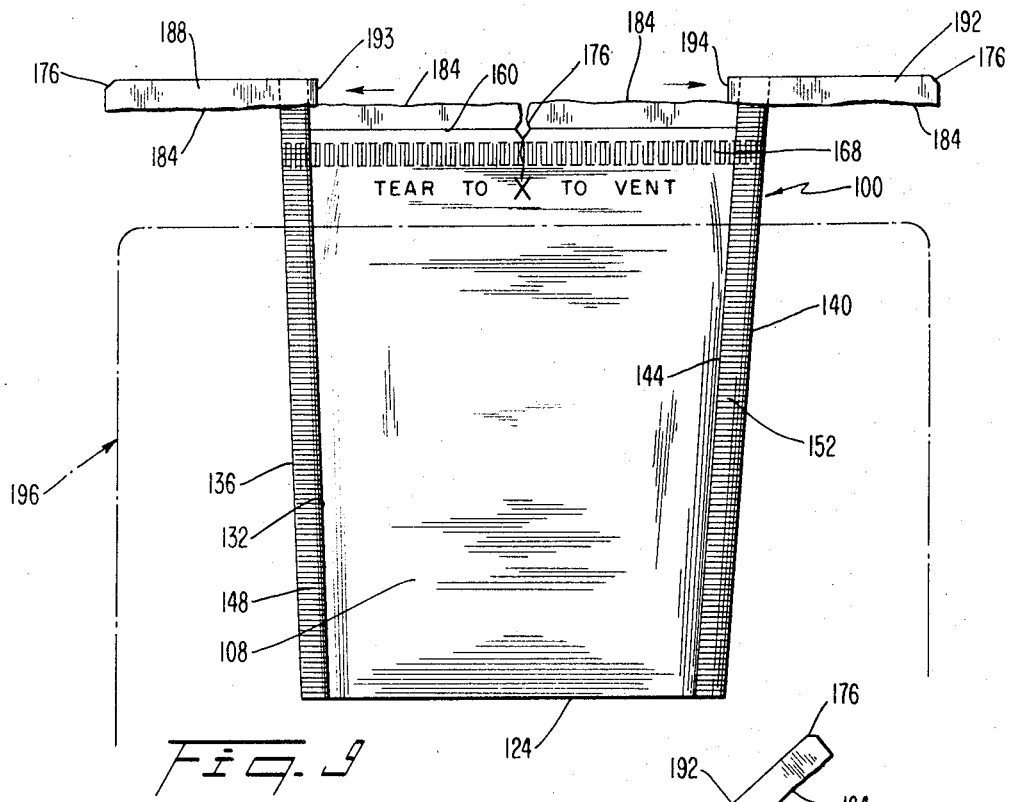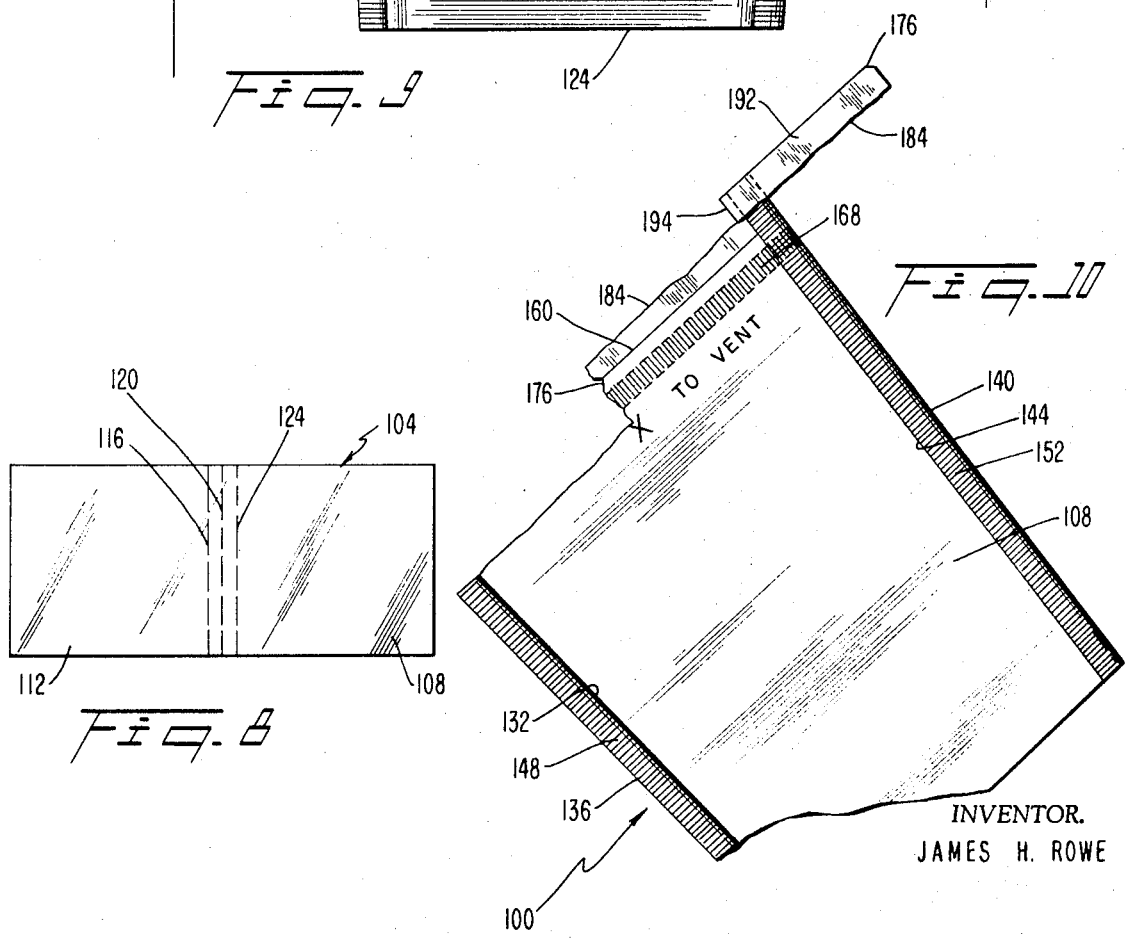

United States Patent Office 3,741,778
Patented June 26, 1973

3,741,778
PACKAGE WITH SELF-CONTAINED HANDLE FOR STORING AND HEATING FOOD, AND METHOD OF FORMING SAME
James H. Rowe, New Hyde Park, N.Y., assignor to Nabisco, Inc., New York, N.Y.
Filed Mar. 9, 1971, Ser. No. 122,307
Int. Cl. B65d 81/34
U.S. Cl. 99—171 H          18 Claims

ABSTRACT OF THE DISCLOSURE

A sealed package having a self-contained handle for storing portions of food and for heating or cooking the food in a toaster. The handle is adapted to be extended outwardly from the toaster and thus to remain cooler than other parts of the package to facilitate removal of the package after completion of the heating or cooking cycle. Also, methods are disclosed for making sealed packages of this type.

BACKGROUND OF THE INVENTION

(a) Field of the invention

The present invention relates to food packages, and specifically to convenience food packages which have self-contained handles and which can be used for storing and cooking food without removal from the package and methods for making same. The present invention more particularly relates to food packages which have self-contained handles that are extended outwardly from the toaster or other heating device to remain cooler than the remainder of the package thus facilitating removal of the package after completion of the heating or cooking cycle and, if necessary, to prevent complete enclosure of the food package in the cooking unit. The present invention also relates to food packages having improved longitudinal stability and strength and which are so constructed as to greatly reduce or eliminate the possibility of snagging in the toaster.

(b) Prior art

Some dry foods, such as rice, flour, sugar, etc., which are not adversely affected by exposure to air have been packaged for both storage and transportation in containers, such as cardboard boxes and paper bags, which provide protection from moisture and foreign matter. In the past, foods that require protection from air have been either canned or, more recently, packaged in flexible containers that do not have the disadvantages of cans which are relatively heavy, bulky, rigid and of fixed shape.

With the advent and popularity of frozen foods, flexible packages have become more or less a necessity in that they permit maximum utilization of freezer space and the packaging of foods of varying shapes and sizes. They also are convenient to handle during preparation and heating. These advantages have made flexible containers popular for a wide variety of foods. However, flexible packages have not reached their full potential because they have not as yet efficiently eliminated the inconvenience of placing the package containing the food, or first removing the food from the package and placing it, in suitable cooking pots or pans, heating or cooking on a stove or in an oven and measuring out portions before serving. This procedure consumes a large amount of time and even more time is wasted in the cleaning of heating or cooking equipment such as stoves, ovens, pots and pans after use. Moreover, misjudgement in the amount of prepared food needed results in too much food leftover or not enough. Misjudgements in the amount of each serving also results in wasted food which is left uneaten. As an example, meats tend to be both the highest cost and most time consuming element of at-home meals. The housewife probably spends more time in preparing meats and in cleaning up after preparation of meats than any other food. Yet very little has been done to provide modern convenience and effective economy in the meat category. There is every indication of a great demand by the housewife as well as institutions, restaurants and other food servers for a high quality, pre-cooked, portion-controlled, easily stored ready to heat-and-eat packaged meat product as well as other food servings such as soups, sauces, gravies, vegetables, rice and all other kinds of cooked or heated table foods.

In the past, packages have been designed with the object of both storing and cooking relatively small measured portions of food therein. However, none of these packages have in practice proved adequate in eliminating or reducing the problems connected with food preparation while also providing a container that may be both economically formed and sufficiently rigid and sturdy to withstand the punishment concomitant with the purveying of food which includes handling by the producer, transporter and server. Some disadvantages of prior packages for both storing and cooking food are that such packages have a considerable tendency to tear to permit air to enter and spoil the food. Also, prior packages have not been formed in such a manner as to facilitate handling without unduly damaging the package and because of their structure the venting of such packages for cooking or heating cannot be easily and precisely accomplished. The removal of food from the prior packages has been difficult and because of the fragile and easily tearable nature of the metallic foil used in the construction of such packages; structural sturdiness has not heretofore been achieved. In addition, the prior packages have been designed for specific foods rather than having a universal design capable of containing a large variety of foods.

In heating the prior food packages, substantially the entire package became too hot to handle with bare fingers and thermal gloves, pot-holders, tongs or other utensil were necessary. As a result, the heated packages were difficult and somewhat hazardous to remove from the heating medium, i.e., a toaster, oven or pot of boiling water. Also, it was extremely difficult to open the prior packages to remove the food contents because this had to be done while the food was still hot and, if cooling of the package were permitted so that it would be cool enough to handle, the food contents usually were cooled below the desired or proper serving temperature. These difficulties are encountered whether the prior packages are heated in a pot of boiling water, in an oven, in a toaster or in any other heating device. While attempts were made heretofore to provide packages of this type with handles, this was done at the sacrifice of compactness, ease of handling, package integrity and/or economy and/or such handles were so positioned or structured as to become too hot to handle with the bare fingers.

Prior packages were also disadvantageous in readily forming a non-flexing apex in those areas where the sheet from which the package is constructed is creased or sealed, for example, along the side edges of the package. This phenomenon is especially pronounced in packages containing fluid or fluid-like materials, such as, liquids, semi-liquids or granular materials. The phenomenon is manifested by a bulging out of the side panels and buckling in of the side edge to form an inwardly directed apex. The inwardly directed apex and material around it are somewhat rigid or non-flexing due to the disposition of the sheet material and stresses therein. As a result, movement of the package contents and resulting stresses on the package cause a pinhole to form at the apex either by breaking through the sheet itself or a seal formed between two sheets, if it has not been formed during the initial buckling of the side edge. Prior packages, because of their bottom construction, also tended to become wedged or snagged in the toaster or to stick to the sides of the toaster slot. In some cases, an external coating provided on the prior packages would crack and peel before or during heating due to inflexibility under the prevailing conditions. Another disadvantage of prior packages is that removal of fluent foods has been extremely difficult since the foods cannot be easily removed from the package by simply lifting them up out of the package due to their fluent nature and dumping the contents normally requires holding the sides or bottom of the package which are not designed for such handling. Furthermore, many food products must be accurately dispensed, such as soups, gravies and beverages, and the mess that results from dumping the contents from the package is undesirable. In order to remove fluent food products from prior packages it is necessary to either tear or cut the top off the package to permit dumping; however, this is undesirable for the reasons mentioned above and further because of the inconvenience and waste of time. Also, the tearing of prior packages for removal of contents is imprecise and many times causes spilling and unappetizing servings.

U.S. Pats. 1,217,818; 2,609,301; 2,633,284; 2,807,550; 2,838,404; 2,881,078; 2,912,336; 3,117,875; 3,132,029; 3,185,372; 3,322,319; 3,361,576; 3,392,033; 3,410,700; 3,415,662; 3,442,662; 3,446,632; 3,469,998; 3,502,487 and 3,554,770 and Canadian Pat. 797,651 disclose packages for storing food and cooking food in the packages in toasters or packages containing other products; however, the packages disclosed in these patents all suffer from one or more of the above-mentioned disadvantages. For instance, none of these patents have overcome the main problems concomitant to packages made of metallic foil, namely, its propensity for undesired tearing, puncturing and mutilation and, in practice, none have proved adequate in eliminating or reducing the problems mentioned above.

BROAD DESCRIPTION OF THE INVENTION

The present invention is directed to food packages having self-contained handle means and methods for making same. The packages provide a practical system for storing an almost unlimited variety of foods in measured or controlled portions from prolonged periods of time and easily heating or cooking the foods in a heating device, such as, a toaster. During packing, shipment, storage and sale of the package, the handles are in a retracted, protected position as a part of the package itself but are easily extended by simple finger manipulation. The handles when extended allow the heating time to be readily varied because they extend out of the toaster to remain cooler than the rest of the package and, if necessary, also prevent the package from dropping completely or nearly completely within the toaster slot, thereby further alleviating the handling problem of the hot package. Further, the handles allow the package to be easily picked up out of the toaster and facilitate opening of the package so that its food contents can be readily delivered, poured, served or placed wherever desired, say on a plate. The served food has little or no loss of tastiness, flavor, freshness and nutritional value.

The present invention is generally characterized by a sealed package, for storing food and heating the food by insertion into a toaster, formed pliable, heat-resistant, tearable, thermally conductive, non-porous sheet material, such as a metallic foil, e.g., aluminum foil, having an electrically insulative outer surface and an inner surface inert to the food contained therein enclosing said food; a sealed top margin for the package; a tear marker on said sealed top margin at a point on the upper extremity of the package intermediate the sides of the package whereby the package may be vented by tearing downwardly from said tear marker along an up-and-down tear line through said sealed top margin; and a separation line in said sealed top margin spaced from the upper free edge thereof and extending laterally from a point spaced from one side of the package to a point spaced from the other side of said package to intersect said up-and-down tear line or said tear marker whereby the handle is formed, after tearing downwardly along said up-and-down tear line to divide the sealed top margin into two portions, by outwardly bending the part of one of the above-mentioned portions which is disposed directly above the separation line. The package can be conveniently formed from a single sheet of said sheet material folded on itself to form front and rear panels. For example, the single sheet can be folded on itself one or more times on one or more spaced medial lines which form the bottom of the package and the facing surfaces of the side and top margins can be sealed together. If desired, for added strength, the side and top margins can be inwardly folded one or more times on lines spaced respectively from the side and top edges. A flattened gusseted bottom can be provided to the package by folding the single sheet on three spaced medial lines, in a first direction, then in the opposite direction and then in the first direction again.

Alternatively, the single sheet can be folded on two medial longitudinal lines which form the side edges of the package, followed by outwardly folding the longitudinal margins along the free edges of the sheet spaced from said medial longitudinal lines and sealing together the facing surfaces of said longitudinal margins to form a longitudinal fin which is then folded on itself one or more times to form a longitudinal seam. Then, the facing surfaces of the bottom margin, i.e., along one free edge of the sheet that intersects the medial longitudinal lines, are sealed together to form a sealed bottom margin which can be folded one or more times upon itself and the facing surfaces of the top margin, i.e., along the other free edge of the sheet that intersects the medial longitudinal lines, are sealed together to form the sealed top margin.

As another alternative, the package of this invention can be formed from two overlying sheets of said sheet material wherein the facing surfaces of the margins along all free edges of the sheets are sealed together. If desired for added strength, one or more of the resulting sealed margins can be inwardly folded one or more times.

The sealed top margins, in any case, can be formed by sealing together the facing surfaces of those areas extending from the top free edge of the sheet to a seal line spaced any desired distance from the top free edge and, of course, extending from side to side of the package. Alternatively, the sealed top margin can be formed by sealing together the facing surfaces of a relatively narrow area extending from side to side of the package but spaced from the top free edge thereof. It is important, however, that the sealed area of the sealed top margin extend below any holes or tear notches placed in the top of the package. Preferably, the sealed top margin is folded once on a fold line spaced inwardly from the top free edge or is twice folded on fold lines successively spaced inwardly from the top free edge.

The tear marker can comprise simply a mark printed on the outer surface of the top margin, or it can comprise a notch, e.g., having a V-shape, cut out of the top extremity of the package, or it can comprise a slit cut into the top extremity. The separation line can comprise simply a tear line imprinted on the outer surface of the top margin, or a score line, or perforated line, or slit, cut into the top margin. The tear marker designates a point for initiating a tear downwardly along an up-an-down tear line through the sealed top margin to vent the package. The separation line is spaced from the top free edge and is located to intersect the up-and-down tear line or the tear marker so that, upon tearing down along said tear line, an elongate part of the top margin along and between the separation line and the free edge of the top margin is freed at the tear line to be bent outwardly, upon tearing or separating along the separation line, to form the handle. When the sealed top margin has been folded on itself one or more times and the separation line is in the folded portion, the handle is freed by unfolding said folded portion. When the separation line is below the folded portion of the sealed top margin, the folded portion is freed at the tear line to be bent outwardly thus forming a reinforced handle. The separation line can extend from both sides of the up-and-down tear line, in which case two handles are formed by bending outwardly, or it can extend from one side only, in which case only one handle is formed.

The method of this invention is characterized by the steps of enclosing the food in a measured portion within a sheet of the above-mentioned sheet material having panels joined along three sides, sealing together the facing inner surfaces of said sheet along a margin adjacent the fourth side to form the sealed top margin, applying a separation line in said sealed top margin extending laterally from a point spaced from one side edge of the sealed top margin to a point spaced from the other side thereof, and applying a tear marker to the upper extremity of the package intermediate the sides thereof at a point intersected by the separation line or at a point locating a tear line intersected by the separation line. The food portion can be placed in the partially formed package, i.e., one which is joined on three sides and has an open top, by introducing it through the open top, or it can be placed on a continuous or elongate strip of the sheet material and the packages can be successively formed around the food portion as described above and successively severed from the elongate strip. The side, bottom and top margins are formed in any of the manners described above and, optionally, the side and/or bottom margins can be folded one or more times, as described above. Folding of the margins is accomplished by guides, rollers, nosers, and other forming devices conventionally used in the packaging industry. Sealing is preferably accomplished by passing the two or more layers (preferably having heat-activatable adhesive coatings on the inner surfaces) to be joined through the nip of two heated rollers to apply heat and pressure to the layers being joined. Alternatively, sealing can be accomplished with heated platens brought to bear on the layers to be joined from opposite sides. The tear marker and/or separation line can be printed on the package using conventional printing techniques or, when they are slits or when the separation line is a perforated line, a suitable slitting or perforating knife or apparatus conventionally used to form slits or perforated lines can be used. Suitable conventional scoring apparatus can be used when the separation line is a score line.

The method can be quite varied, for example, the margins can be folded and then sealed or can be sealed, then folded, or can be folded and sealed in the same step. The tear marker and separation line can be applied in separate operations or they can be applied in the same operation.

The heating means used to heat or cook the packages of this invention can be any conventional heating or cooking means, and is preferably a conventional electric toaster. The toaster is one of the most common, least expensive and probably least used appliances in home, commercial and institutional kitchens. Almost every kitchen has one or more. The toaster also is one of the easiest heating appliances to operate and maintain and very seldom requires cleaning. As such it provides an almost ideal implement of convenience in "instant" meal preparation.

The package of this invention can be used by restaurant and institutional industries including airlines, cafeterias, hotels, motels, hospitals, drug stores, department stores, vending machines, clubs, schools and the like where it is desired to serve food to large numbers of patrons or patients with a minimum of effort and manpower. The armed services are faced with similar problems where large numbers of people are served meals. Similar problems, on a smaller scale, are faced in the home and the intensity of the problems varies with the size of the family. This package helps the housewife to eliminate or reduce food preparation and clean-up time and effort. In small families or with persons living alone, it is very difficult to purchase food for preparation in single serving portions or even two or three portions. For those persons this package is ideal and there are essentially no leftovers. Also, elderly people and others who are concerned with their diet have difficulty in controlling the size of servings consistent with their dieting needs or objectives. This package helps remove that problem. Members of most families have different likes and dislikes in foods, thus adding to the feeding problems of the housewife and potential waste because of leftovers and spoilage. Families having infants or small children who are not able to consume the usual family menu repeatedly face the problem of leftovers and potential spoilage of baby foods. Busy families whose members have different schedules are on the increase in our way of life and present problems to the housewife in serving adequate nourishment to the family in appetizing form. All of those problems are helped by the package of this invention.

DETAILED DESCRIPTION OF THE INVENTION

The following is a detailed description of the preferred embodiments of the invention together with accompanying drawings. However, it should be understood that the invention is capable of numerous modifications and variations apparent to those skilled in the art without departing from the spirit and scope of the invention.

In the drawings:

FIG. 1 is a perspective view of the front of a package constructed in accordance with this invention;

FIG. 2 is a front elevation of the package of FIG. 1 after the package has been vented and the top unfolded;

FIG. 3 is a bottom plan view of the package of FIG. 1 illustrating the bottom and side construction;

FIG. 4 is a left side elevation of the package of FIG. 1 illustrating the top construction;

FIG. 5 is a perspective view of sheet material folded on three spaced medial lines forming the bottom illustrating the early stages of manufacture of the package of FIG. 1;

FIG. 6 is a front elevation of the sheet material after folding as shown in FIG. 5 illustrating the fold lines used in preparing the package of FIG. 1;

FIG. 7 is a perspective view of the package of FIG. 1 after the bottom and sides have been formed but prior to completing the top;

FIG. 8 is a plan view of a blank of sheet material used to prepare the package of FIG. 1 illustrating the spaced medial lines used to form the bottom;

FIG. 9 is a front elevation of the package of FIG. 1 after the package has been vented and the handles have been extended illustrating the package positioned in a toaster, and FIG. 10 is a broken front elevation of the package of FIG. 9 after heating and after the upper left hand corner has been torn off so that the package can be conveniently emptied of its contents.

In making the packages shown in the drawings, and described herein, it is preferable to employ pliable, heat resistant, tearable, thermally conductive, non-porous sheet material, such as a metallic foil, for example, aluminum foil having a thickness of about 1.5 to about 3 mils or annealed steel foil having a thickness of about 1 mil to about 1.5 mils. One side of the foil, which will be the interior surface of the package, preferably is treated, or otherwise conditioned, to provide it with a surface which is substantially inert with respect to the food to be contained and which is preferably heat fusible, for example, a heat-fusible coating inert to the food and having a thickness of about one-tenth of a mil. The other side of the foil, which will be the exterior surface of the package, should be treated, or otherwise conditioned to provide it with a dielectric, or electrically insulative surface, in order to insure against the possibility of causing a short circuit which might otherwise result from contact between the unprotected foil and the wiring of an electric toaster. The dielectric surface may comprise a coating of dielectric material having a thickness of approximately two-tenths of a mil, for example. The dielectric surface may also include a further protective or colored coating of a protective material such as an epoxy resin, for example, having a thickness of about one-tenth of a mil or a single coating itself may be sufficient to both protect and insulate the foil and provide the desired color or design.

An especially preferred metallic foil is aluminum foil which can be used in the thickness given above or in thicker or thinner sizes as desired or required for specific applications. Soft annealed steel foil and stainless steel foil are also available and can be used in the thicknesses given above or in thicker or thinner gauges as desired or required for specific applications. Substantially any heat-conductive sheet material can be used in place of the metallic foil. For example, heat-resistant plastic films, such as Mylar, having thin coatings of vapor deposited metals are useful. Also, plastic films formed with substantial amounts of metallic particles dispersed throughout are also useful.

The dielectric surface is for the purpose of electrically insulating the package in the event of contact with the heating elements of the toaster. Substantially all thermosetting plastics and high heat-resistant thermoplastics in the absence of electrically-conductive additives are dielectrics or electrically insulative and any suitable thermosetting or high heat-resistant thermoplastic can be used. For example, epoxy resins can be used. Polytetrafluoroethylene (Teflon) is a preferred dielectric surface in many instances, because, in addition to providing electrical insulation, it also provides a non-sticking, low friction, surface which remains flexible even under the high temperatures encountered within a toaster in operation. Phenolic resins, melamine-formaldehyde resins, urea-formaldehyde resins, phenoxy resins, and polyester resins are examples of other suitable resins that can be employed in making the dielectric surface. These materials are also useful in providing the protective coating, if used, over the dielectric coating.

The inert, heat-sealable layer preferably comprises a heat-activatable adhesive, for example, a thermoplastic material having softening temperatures above about 212° F. The inert layer is preferably transparent so that the shininess and reflectivity of the surface of the sheet material or metallic foil is preserved as much as possible. High melting polyester resins, polyacrylic resins and the like can be employed. When thermoplastic materials are used in any of the coatings or layers, such materials should not melt or soften to any undesirable extent at temperatures normally encountered in toasters and preferably not below 212° F.

Any type of lettering or designs such as labels, instructions, trademarks, etc. may be placed on the front and rear panels of the package. The outer surface of the package which, for example, may be formed of dark blue epoxy which is primarily heat-absorptive may also be over-printed with various patterns of white which is primarily heat-reflective to control heat absorption and distribution inside the package in accordance with the heating requirements of the food product contained in the package. Of course, it will be understood that the above materials are illustrative only and that other materials, which are well known in the art may be substituted.

Package 100 is illustrated in FIG. 1 and is the preferred embodiment of this invention. Package 100 is formed of a single sheet or blank 104 of material as shown in FIG. 8. Sheet 104 is folded upon itself to form front panel 108 and back panel 112. The center portion of sheet 104 is folded on spaced, medial fold lines 116, 120 and 124 in the manner illustrated in FIG. 5 to form expandable gusset bottom 128 and to overlie the panels 108 and 112 as best seen in FIG. 6. The gusset bottom 128 allows package 100 to hold relatively larger food portions without the package being seriously deformed and provides a relatively flat bottom to the package. The side margins of the overlying panels 108 and 112 are folded upon themselves twice respectively on successively inwardly spaced fold lines 132, 136 and 140, 144, as shown in FIG. 6. The facing inner surfaces of the side margins are sealed together in the areas extending between the respective free side edges and the innermost fold lines 136, 140 and between the top free edge and the bottom fold lines 116, 124 and sealing can be accomplished prior to folding or after the first fold has been made on each side. FIG. 7 illustrates the sealed, double folded side margins 148, 152. The increased strength of the sealed double folded side margins 148, 152 provides longitudinal stability to the package and assures that there is sufficient strength when the handles hereinafter described are extended in use as shown in FIG. 9. The food contents can be inserted through the open top.

The top is closed by folding the top margin of overlying panels 108 and 112 upon itself successively twice on spaced fold lines 156 and 160, shown in FIG. 7, thus forming a folded top margin 164. The innermost fold line 160 becomes the top fold line of the finished package. The facing inner surfaces of the top margin are sealed together along a narrow strip or top seal 168 extending from side to side. Top seal 168 can be formed prior to folding the top margin or after making the first fold on fold line 156. It is advantageous to form top seal 168 prior to folding so that the folds can be easily made. When handles 192 hereinafter described are used in the extended position, there is little stress, as such, on top seal 168. Folded top margin 164 provides a convenient and strong lifting means during handling and venting before the heating step. In those cases where more rigidity and strength is desired or required in the upper parts of the package, the facing inner surfaces of the top margin can be sealed together not only along the narrow strip 168 but also in those areas extending above said strip to the top free edge and from side to side of the package. A tear marker such as V-shaped notch 176, is located on top fold line 160 tear line 172 to indicate the point at which package 100 should be vented. The tear marker can be simply a suitable symbol printed on the package although a tear notch is preferred to aid in tearing the material when venting. A tear line 177 can also be printed on the outer surface of the package to designate the direction of tearing and a suitable symbol, such as the X shown in FIGS. 1, 2 and 9, can be printed on the outer surface to designate the point at which the venting tear should be stopped. The venting tear preferably is made prior to unfolding the folded top margin 164 since the full distance of the venting tear can be covered by tearing action over about a third of the full distance.

A lateral separation lines 184 (best seen in FIG. 2) is placed in the top margin extending from a point spaced from sealed, folded side margin 148 to a point spaced from sealed, folded side margin 152 and intersecting the venting tear line 177. The separation line 184 can be simply printed on the package or can be a perforated or scored line or a slit and can intersect the venting tear line 177 and/or the tear marker 176. Also, the separation line 184 can extend toward only one of the sealed, folded side margins 148 or 152 in which case only one handle will be made available. The lateral separation line 184 can be located at any position in the sealed top margin so long as it is above the lowermost extremity of the top seal 168.

In those cases where the separation line is a printed line, it is advantageous to locate it on one of the fold lines 156, 160 because tearing is facilitated due to the weakening or fatigue of the sheet material caused by the crease made in forming the fold. When separation line 184 is located on fold line 160, the top margin need only be unfolded on fold line 160 prior to separating along separation line 184 and need not be unfolded on fold line 156. As a result the handles 188 and 192 are further strengthened since they are then formed of four thicknesses of sheet material and the thickness of the side margins to which they are joined is also multiplied.

Separation line 184, tear marker 176 and venting tear line 172 can be placed at any convenient time in the formation of the package but are preferably placed after top seal 168 has been formed and before folding. However, these lines can be placed before sealed side margins 148 and 152 are formed or before top seal 168 is formed or before the top margin is folded or before the sheet 104 is folded or otherwise manipulated.

After the venting tear is made and the top margin is unfolded (see FIG. 2) those parts of the top margin positioned above separation line 184 are separated along said separation line from those parts disposed below the separation line and are folded outwardly to form handles 188 and 192 as best seen in FIG. 9. The outward folding is preferably accomplished on fold lines 193 and 194 adjacent the sealed, folded side margins 148, 152. The handles 188 and 192 are preferably folded through an arc of 180° as shown in FIG. 9, although they can be folded through lesser arcs in which event they extend from the general plane of the package. Handles 188 and 192 facilitate the placing of package 100 in electric toaster 196 and the removal of the package after the food contents are cooked or heated. After heating, the main body portion of package 100 is hot to the human touch, but the ends of handles 188 and 192 remain relatively cool. Handles 188 and 192 are preferably coated with a light colored material so that they are primarily heat-reflective areas. This helps keep the handles cool enough so that they can be touched, handled, and used to pick up the package after it has been heated in the toaster. This allows them to be readily touched and handled for removal from the toaster and subsequent manipulation to open the package. During cooking, the vent allows steam and vapors to escape to the atmosphere. After package 100 is removed from toaster 196, a half of the top of the package below seal 168 can be torn or cut off as shown in FIG. 10 to present the food for serving. The heated or cooked contents of the package can then be emptied onto a suitable serving dish. If necessary, the top of the package can easily be torn or cut off from side to side to further facilitate the removal of the food contents.

As used herein, the term "aluminum foil" is intended to include aluminum alloys especially of the type made and sold by aluminum manufacturers in the form of foil or sheet for food packaging uses. Also, the term "steel foil" as used herein is intended to include soft annealed steel foils as well as soft steel alloy foils and stainless steel foils of the type made and sold by steel manufacturers in the form of foil or sheet for food uses.

The width and thickness dimensions of the packages formed in accordance with this invention preferably should be less than those of the heating compartment of a conventional household toaster. The length of the package of this invention preferably is greater than the maximum depth of the toaster slot such that the top of the package, for example, above the top seal 168 extends out of the toaster slot at all times. In those cases where the length of the package is less, the handles 188 and 192 suspend the package and prevent its total submergence in the toaster. However, the dimensions of the packages are determined by the particular heating appliance in which it is designed to be heated, and, consequently, it is clear that packages according to the present invention may be designed for larger and different heating appliances in order to accommodate larger portions of food or to provide quicker heating.

The packages according to this invention are preferably made of the sheet materials described hereinbefore wherein the surface of the sheet material adapted to be disposed on the interior of the package is coated with a heat-activatable adhesive. The facing inner surfaces of the sheet material formed into the packages of this invention are sealed in those areas, such as, along side, top and bottom margins, and along longitudinal seams, if any, which are desired to be sealed, by the application of heat and pressure to such areas to activate the heat-activatable adhesive coating on such surfaces. If desired, however, other sealants or adhesives resistant to the high temperatures encountered in the toaster can be used on those areas desired to be sealed in addition to or in place of the heat-activatable coating. Sealing can be accomplished by mechanical deformation, such as crimping or ridging; for example, as obtained with mating, heated sealing rolls having ribbed surfaces.

The use of the packages of this invention for heating or cooking and serving will now be described. The package is retrieved from its storage space, wherein it may be stocked on a shelf in a freezer or closet, by grasping the top margin of the package as a handle to prevent unintentional tearing or other damage to the package. The top margin is grasped by the server with both hands, and force is applied at the tear marker, or markers if more than one is used, with one hand while holding the top margin steady with the other hand to tear the package just far enough downwardly to permit communication of the interior of the package with the atmosphere. However, tearing is stopped as soon as venting has been established. In order to assure proper venting, a mark, such as an X, may be printed on one of the panels (see FIGS. 1, 2, 9 and 10) to indicate the proper termination of the vent tear line.

Venting of the package separates the top margin into two portions and one or both those parts of the portions located above the separation line 184 may now be folded outwardly by first separating them along separation line 184 to form handles 188 and 192 which facilitate insertion of the package into and removal from a toaster. It is noted that the handles 188 and 192 prior to outward folding are compactly formed in the package so as to require only a minimum of space for storage while providing upon outward folding a gripping or handling tab which extends out of the toaster and remains cooler than the other parts of the package to facilitate easy access to the package.

The packages are protected from damage caused by the heating elements inside the toaster due to their simplicity of design and smooth surfaces which permit no loose edges or flaps that could be accidently snagged in the toaster. The provision of a Teflon coating to some or all of the outer surfaces of the package as described hereinabove also protects the package from damage while in the toaster or while inserting it or removing it by avoiding the sticking of the package to the internal parts of the toaster. By keeping the sealed bottom margin relatively short or by providing the flattened (gusset) bottom as shown in FIGS. 3 and 4, the package has a good base of support at the bottom of the toaster which support is enhanced by the increased rigidity imparted by the thickened side edge margins provided by folding and/or sealing. Conventional toasters are ideal for use with the packages of the present invention since they provide good heat and have timing devices constructed integrally therewith. Once the package has been vented, it is inserted in the toaster, the toaster is energized under the control of the timing device, and whether the food contained in the package is to be actually cooked or merely heated depends on the type of food and its previous preparation. The vent formed prior to inserting the package in the toaster permits steam and vapors to escape to the atmosphere and the size of the vent may vary with the desired cooking or heating conditions. If the toaster time device is not capable of varied heating times, and the heating requires more or less time, the handles can readily be used to lift the package out when its allotted heating time has expired. The toaster can be depressed several times, to successively activate it and provide longer heating times. Also, two or more packages can be heated at once and each can easily be removed by means of the handles when their allotted heating time expires, without having to stop the heating operation of the toaster to remove each package as it becomes ready.

The food contents can be inserted into the packages described hereinabove after the packages have been formed with an open mouth as previously described. However, the packages of this invention can be conveniently formed by placing the food on a continuous strip of sheet material, or between two continuous strips of sheet material, followed by the cutting, sealing and folding operations previously described for each of these packages.

Illustrative of foods which can be packaged in accordance with the present invention are beef burgundy, hamburgers (seasoned and unseasoned), pizza bungers, beef stew, beef stroganoff, corned beef slices, boneless short ribs of beef, hickory smoked beef slices, roast beef slices (with and without gravy), barbecued beef, ham slices and steaks, chicken slices, turkey slices, meat loaf (with and without gravy), veal cutlet (breaded and otherwise), chicken fried steak, meat balls, meat balls in spaghetti sauce, Swedish meat balls, Salisbury steak (with or without onions), lamb chops, Swiss steak, beef steaks, pork chops, fish, breaded filets, mushrooms (with and without gravy), gravies (chicken, brown, beef, etc.), sauces (white, hollandaise, barbecue, etc.), stuffings (turkey, meat, bread, etc.), cocktail franks, corn-muffins, dinner rolls, spaghetti sauce, spag O's with meat balls, shrimp fried rice, chicken chow mein, tamales, chicken a-la king, chicken fricassee, Manhattan clam chowder, New England clam chowder, chili, ravioli, sloppy Joe, beef gravy, cream corn, sweet peas, chocolate fudge sauce, fried claims, clam sticks, fish sticks, shrimp cakes, shrimp marinara, sweet sausage and peppers, instant mashed potatoes, instant sweet potatoes, egg rolls, stuffing, rice, garlic bread, soup (dehydrated), coffee, baby foods, hot chocolate, cereals, tea, pet foods, hot gravies for pet foods, pie fillings, custards, toppings (chocolate, butterscotch, etc.), desserts (puddings, etc.), vegetables (with or without sauces, butter, etc.).

These foods, especially the meats, are preferably fully prepared, pre-cooked, and frozen requiring only thawing and reheating prior to serving. In this connection it has been unexpectedly found that the toasting times and temperatures characteristic of conventional toasters are fully adequate for thawing and adequately reheating frozen foods to temperatures which are high enough for serving and eating. Foods that are amenable to storage without freezing or refrigeration, of course, need not be frozen or refrigerated but simply stored on the shelf in the packages of this invention. Cereals, dehydrated soups, hot chocolate powders, tea and other shelf-suitable foods fall into this category. Also, those foods which are of the instant type requiring only the addition of hot water and those foods which require only a small amount of cooking time need not be pre-cooked. Cereals, rice, hot chocolate powders and tea fall into this category.

The present invention drastically reduces the time, effort and manpower needed for the preparation and serving of meals. It substantially eliminates the need for measuring out portions, since each package contains a controlled amount of food. It permits a wide range of selectivity for serving a wide variety of personal tastes at one sitting with almost no extra effort and in a minimum amount of time. It also permits more precise control of food intake without wastage for those concerned with diet and allows the preparation of single meals which are well balanced for those who live alone. It substantially eliminates left-overs and cuts clean-up time to a minimum. Cleaning of cooking equipment is obviated, since no pots and pans are used and the package after use is simply discarded. The only heating appliance used is the conventional toaster which, with a minimum of care, is not dirtied. The present invention permits an ultimate of convenience in the preparation of full, well-balanced, appetizing meals without any expenditures for expensive heating or cooking equipment, and does so with the advantage that the package can be handled after the food is heated and served without burning one's fingers or requiring the use of gloves, clumsy heating pads, or utensils.

The packages of the present invention are not only useful in the home but find extensive utilization in commerce in restaurants, hotels, clubs, cafeterias, vending machines, snack bars, lunch counters, food stands, in hospitals, nursing homes, prisons, schools, colleges, in the armed services, employees cafeterias, and in any kitchen whether private, commercial or institutional.

The above description and particularly the examples are set forth by way of illustration only. It will be obvious to those skilled in the art that many variations and modifications thereof can be made without departing from the spirit and scope of the invention herein described.

What is claimed is:

1. A sealed package having an electrically insulative outer surface, for storing food and heating the food by insertion into a toaster, formed of pliable, heat-resistant, tearable, thermally conductive, non-porous sheet material enclosing said food; a sealed top margin for the package; a tear marker on said sealed top margin at a point on the upper extremity of the package intermediate the sides of the package whereby the package may be vented by tearing downwardly from said tear marker along an up-and-down tear line through said sealed top margin; and a separation line in the form of a printed line, a fold line, a perforated line, a score line, or a slit, in said sealed top margin spaced from the upper free edge thereof and extending laterally from a point spaced from one side of the package to a point spaced from the other side of said package to intersect said up-and-down tear line or said tear marker whereby a handle may be formed, after tearing downwardly along said up-and-down tear line to divide the sealed top margin into two portions, by outwardly bending the part of one said portion disposed directly above said separation line.

2. Sealed package as claimed in claim 1 wherein said separation line is a score line.

3. Sealed package as claimed in claim 1 wherein said separation line is a tear line.

4. Sealed package as claimed in claim 1 wherein said separation line is a slit.

5. Sealed package as claimed in claim 1 wherein said tear marker is a tear notch.

6. Sealed package as claimed in claim 1 having two side margins extending along side edges of said package wherein a said side margin has a fold on a fold line spaced from the side edge of the package.

7. Sealed package as claimed in claim 6 wherein said side margin has a double fold on successive fold lines spaced from said side edge of the package.

8. Sealed package as claimed in claim 6 wherein each of the two side margins of the package has a fold, respectively on fold lines spaced from each side edge of the package.

9. Sealed package as claimed in claim 8 wherein each of the two side margins each has a double fold, respectively on successive fold lines spaced from each side edge of the package.

10. Sealed package as claimed in claim 1 wherein the facing inner surfaces of the side margins of the packages are sealed.

11. Sealed package as claimed in claim 1 wherein the package is formed with a flat bottom.

12. Sealed package as claimed in claim 1 wherein said sealed top margin is folded upon itself twice.

13. A sealed package as claimed in claim 1 wherein the package comprises a single sheet of said sheet material having a fold on a medial line spaced from two opposed free edges of said sheet comprising the top free edges of the package and having reverse folds on two lines each spaced from said medial line on each side thereof to comprise a gusseted bottom, the facing inner surfaces of the margins along the side edges which intersect the medial line being sealed together.

14. Sealed package as claimed in claim 1 wherein said sheet material is aluminum foil having an electrically insulative outer surface and an inner surface that is inert to the contained food.

15. Sealed package as claimed in claim 1 wherein said sealed top margin is sealed along a narrow strip extending from side to side of the package below said separation line and below those portions of the top margin underlying said tear marker.

16. Sealed package as claimed in claim 1 wherein said points spaced from one and the other of the sides of the package are adjacent the respective said sides and the separation line extends from both sides of said up-and-down tear line or said tear marker.

17. A method of packaging food in a sealed package for storing the food and heating the food by insertion into a toaster, formed of pliable, heat-resistant, tearable, thermally conductive, non-porous sheet material, comprising the steps of: enclosing said food in a measured portion within a sheet of said sheet material having opposed panels joined along three sides; sealing together the facing inner surfaces of said sheet along a margin adjacent the fourth side to form a sealed top margin; applying a separation line in the form of a printed line, a fold line, a perforated line, a score line or a slit in said sealed top margin extending laterally from a point spaced from one side edge of the sealed top margin to a point spaced from the other side edge thereof; and applying a tear marker to the upper extremity of the package intermediate the sides thereof at a point intersected by said separation line or locating a tear line intersected by said separation line.

18. Method as claimed in claim 17 wherein said sheet is initially a part of an elongate strip of said sheet material and is severed therefrom during formation of said package.

References Cited
UNITED STATES PATENTS

| | | | |
|---|---|---|---|
| 3,615,711 | 10/1971 | Markus et al. | 99—171 H |
| 3,217,971 | 11/1965 | Shuetz | 229—66 X |
| 3,615,706 | 10/1971 | Robinson | 99—171 H |
| 2,571,138 | 10/1951 | Irmscher | 99—77.1 |
| 2,881,078 | 4/1959 | Oritt | 99—171 H |

TIM R. MILES, Primary Examiner

W. L. MENTLIK, Assistant Examiner

U.S. Cl. X.R.

99—171 M; 229—66